(No Model.)
A. B. SEE.
ELEVATOR CAGE AND SAFETY APPLIANCE.
No. 324,493. Patented Aug. 18, 1885.
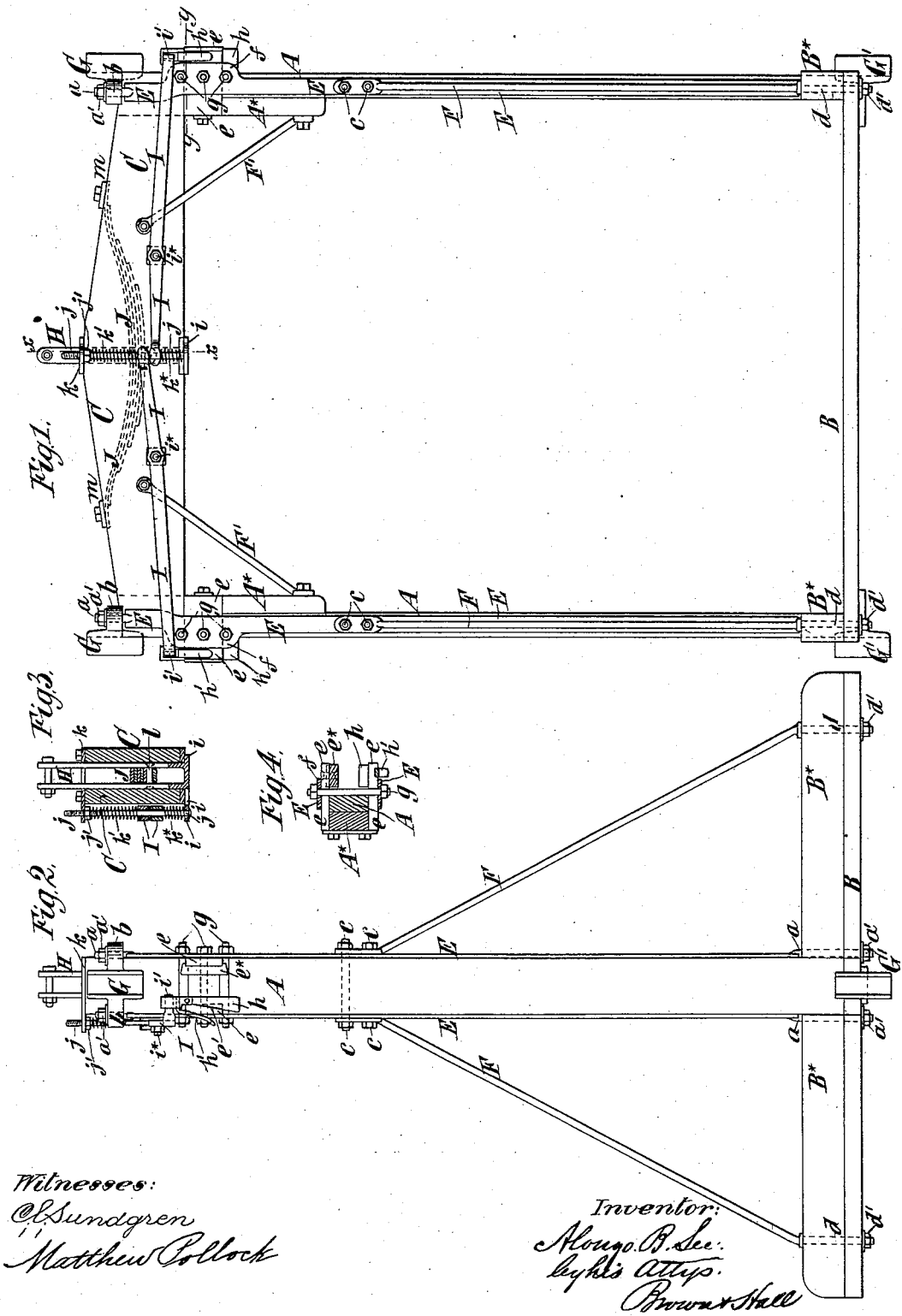
Witnesses:
O. F. Sundgren
Matthew Pollock
Inventor:
Alonzo B. See
by his Attys.
Brown & Hall

UNITED STATES PATENT OFFICE.

ALONZO B. SEE, OF BROOKLYN, NEW YORK.

ELEVATOR-CAGE AND SAFETY APPLIANCE.

SPECIFICATION forming part of Letters Patent No. 324,493, dated August 18, 1885.

Application filed January 3, 1885. (No model.)

*To all whom it may concern:*

Be it known that I, ALONZO B. SEE, of Brooklyn, in the county of Kings and State of New York, have invented a new and useful Improvement in Elevator-Cages and Safety Appliances therefor, of which the following is a specification.

The frame-work of an elevator, to which the hoisting-cables are attached, is commonly termed the cage, whether it support a simple platform, as in a freight-elevator, or a cab or car, as in a passenger-elevator. The safety appliances are attached to or combined with this cage; and my invention relates to its construction, and to that class of safety apparatus which comprises wedges that are thrown into action when the hoisting-cables break, and by binding or cramping on the upright guides stop the cage.

In many elevator-cages of this class the pair of jaws in which the safety-wedge is placed forms one of the slides—as, for example, a lower slide—of the cage, the wedge itself forming one side or face of that slide, and the other or upper slide is a rigid fork or jaw, which embraces the upright fixed guide. In such cages the wedge is often liable to derangement by friction on the upright guide.

One feature of my invention consists in the combination, with a cage having upper and lower slides, which are of fixed width, and independent of any safety appliances, of safety jaws or forks between the upper and lower slides, and each comprising a wedge movable upon one jaw or side of the fork, and operating, in conjunction with the other jaw or side of the fork, to clamp the upright guide along which the cage travels. The safety-jaws and wedges then have no function in guiding the cage, and are not liable to displacement by friction on the upright fixed guides.

The invention also comprises other novel features of construction and combinations of parts, hereinafter described, and pointed out in the claims, whereby the safety-jaws and their wedges are combined with the cage in a very strong and reliable manner, and whereby the wedges are raised or thrown into action independently of any falling movement of the cage, and are therefore more effective in stopping the cage before it can acquire any degree of momentum.

In the accompanying drawings, Figure 1 is a front elevation of a cage embodying my invention. Fig. 2 is a side elevation thereof. Fig. 3 is a transverse section of the upper cross portion of the cage on the plane of the dotted line $x\ x$, Fig. 1; and Fig. 4 is a horizontal section of one side portion or upright of the cage on the plane of the dotted line $y\ y$, Fig. 1.

Similar letters of reference designate corresponding parts in all the figures.

A A designate the two posts or standards, which form the upright portions at opposite sides of the cage.

B designates the platform, and C C designate two parallel beams or stretchers, which are bolted securely to the upper ends of the pieces A at opposite sides thereof, and form the upper cross-portion or head of the cage. At each end of the platform B, and extending on opposite sides of the posts or uprights A, are horizontal timbers B*, secured to the platform B.

On opposite sides of each upright A are strong straps or re-enforcing bars, of iron, E, which extend from top to bottom of the cage, and have at their upper and lower terminations screw-threaded stub-ends or bolts $a$, provided with nuts $a'$.

At the top and bottom of the cage are slides or guiding-jaws G G', which are of invariable width or opening, and are capable of sliding freely on the fixed upright guides. (Not here shown.) The lower slides, G', are bolted to the under side of the platform, and the lower stub-ends, $a$, of the re-enforcing straps E pass through the timbers B* and the platform, and have their nuts $a'$ at the under side thereof. The upper stub-ends of said straps E pass through flanges or ears $b$ on the upper slides, G, and by their nuts $a'$ the said upper slides are secured firmly in place.

From the uprights A diagonal braces F extend to the platform B, near the outer edges thereof. The upper ends of these braces are secured rigidly to the uprights by bolts $c$, one or both of which may pass directly through the uprights and straps, thereby securing the upper ends of the braces to both the uprights and straps. The lower ends of these braces F have stub-ends $d$, which pass directly through the timbers B* and platform B, and have nuts $d'$ applied to them.

The uprights A have re-enforcing pieces A* applied to their inner sides at the upper ends and corner, or diagonal braces F' at the top, as shown in Fig. 1; and it will be seen that as the platform is sustained by the four straps E and a corresponding number of braces, F, a very strong and rigid cage is thereby produced. Near the upper ends of the uprights A they are notched in opposite edges, and in the notches or recesses are fitted pairs of wrought-iron plates or blocks $e$, which form the safety-jaws. The re-enforcing straps E are widened at these points, as shown at $f$, and form cheeks which bear upon the blocks or pieces $e$, and all are secured firmly together and to the uprights by bolts $g$, inserted directly through opposite straps E and plates $e$ and the interposed uprights, as best seen in Fig. 4.

On the inner side of one plate or jaw $e$ is secured a block or facing-piece, $e^*$, which may be of cast metal, and constitutes a part of the jaw; and on the inner side of the other plate or jaw $e$ is a wedge, $h$, the face of which is upright and the inclined back of which fits an inclined seat, $e'$, on the plate or jaw $e$, as best seen in Fig. 2. The wedge $h$ has a hook or finger, $h'$, extending from its top over outside the plate or jaw $e$, to which it is applied, and is thereby held in place ready for action. When the parts occupy the position shown in Fig. 2, (the wedge being there shown down,) the space between the face of the wedge and the face of the block $e^*$ is as great as the opening in the slides G G', and hence the wedge does not serve as a slide and is not liable to be displaced in the ordinary operation of the cage.

H designates a U-shaped hoisting-connection, to which the hoisting-cables are to be attached, and which fits between the two beams, C C, which form the head of the cage, as shown in Fig. 3. This connection has at the lower end flanges $i$, which underlap and bear upon the beams C, and from one of them, which projects laterally beyond the head, a screw-threaded rod or bolt, $j$, extends upward outside the head and is fitted to a guide, $k$, at the top of the beams C, to which the hoisting-connection or shackle H is likewise fitted.

I designates levers, which are fulcrumed at $i^*$, and the outer ends of which are turned inward at $i'$ and engage the upper ends of the wedges $h$. The inner ends of these levers are forked to embrace the rod $j$, and are held in place vertically thereon by springs $k'$ $k^*$, the tension of which may be regulated by a nut, $j'$. The safety-spring J is of semi-elliptic form, and its middle is connected by a pin, $l$, with the hoisting-connection H, while its ends bear upon plates or abutments $m$ at the top of the beams C.

So long as the weight of the cage is sustained by the hoisting-cables the hoisting-connection H remains in the position shown in the drawings, and by its flanges $i$, bearing against the under side of the head, raises the cage. The nut $j'$ should be so adjusted that the springs $k'$ $k^*$ will hold the levers I, with the wedges $h$, just out of contact with the upright fixed guides on which the cage works.

If the hoisting-cables part the resilience of the spring J will throw down the hoisting-connection H, and by thus lowering the inner ends of the levers I will raise their outer ends and so move the wedges $h$ upward into clamping relation with the facing pieces or blocks $e^*$, and will thereby clamp the upright guides with sufficient strength to hold the cage. It will be observed that this clamping action is produced without any downward movement of the cage and is effected the instant the parting of the cables releases the shackle or hoisting-connection H.

It will be observed that the clamping action of the wedge and its opposite jaw does not tear away and mutilate the safety-strips or guides, which are usually of wood.

What I claim as my invention, and desire to secure by Letters Patent, is—

1. The combination, with an elevator-cage, of upper and lower slides independent of any safety appliances, and safety jaws or forks between the said upper and lower slides, and each comprising a safety-wedge movable upon one jaw or side of the fork, and operating in connection with the other jaw or side of the fork to clamp the upright guide along which the cage moves, substantially as herein described.

2. The combination, with the elevator-cage, comprising the uprights A, of the plates or pieces $e$, and bolts $g$, whereby they are secured to opposite sides of said uprights, the safety-wedges $h$, and spring-actuated safety appliances for operating the wedges, substantially as herein described.

3. The combination, with the uprights A, recessed or notched on opposite sides, of the safety-plates $e$, fitting the recesses or notches, the re-enforcing-straps E, widened at $f$ to form cheek-pieces for supporting the outer sides of the plates $e$, the bolts $g$, inserted through the straps and plates, the safety-wedges $h$, movable upon one of said plates, and safety appliances whereby said wedges are thrown into action, substantially as herein described.

4. The combination, with the uprights A, the safety-plates $e$, and bolts $g$ for securing the plates to opposite sides of the uprights, of the wedges $h$, and hooks or hangers $h'$ for supporting them each upon one plate $e$ of a pair, and safety appliances for raising the wedges into action, substantially as herein described.

5. The combination, with the elevator-cage and its safety-jaws $e$ $e$, and the safety-wedges $h$, each movable on a jaw $e$ and operating in conjunction with the opposite jaw to clamp the guide along which the cage travels, of the levers I for operating the wedges, the hoisting-connection H, and its rod $j$, and the safety-spring J, substantially as herein described.

6. The combination, with the cage and its safety-wedges $h$, and levers I, connected with the wedges at one end, of the hoisting shackle or connection H, and its rod $j$ and safety-spring J, and the adjusting springs $k'\ k^*$, and nut $j'$, substantially as herein described.

ALONZO B. SEE.

Witnesses:
 MATTHEW POLLOCK,
 FREDK. HAYNES.